US006614196B1

(12) United States Patent
Akahane et al.

(10) Patent No.: US 6,614,196 B1
(45) Date of Patent: Sep. 2, 2003

(54) VEHICLE WITH RUNNING MECHANISM AND LIFTING MECHANISM

(75) Inventors: Fumihiro Akahane, Kanagawa (JP); Shinichi Kobayashi, Aichi (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 228 days.

(21) Appl. No.: 09/709,391

(22) Filed: Nov. 13, 2000

(30) Foreign Application Priority Data

Feb. 8, 2000 (JP) ...................................... 2000-029943

(51) Int. Cl.7 ............................... B60L 1/12; H02P 7/00
(52) U.S. Cl. .......................................... 318/139; 318/51
(58) Field of Search ............................ 318/139, 34, 41, 318/51, 53, 564; 388/907.5, 909

(56) References Cited

U.S. PATENT DOCUMENTS 3,947,744 A * 3/1976 Grace et al. ............ 318/139 X
4,723,107 A * 2/1988 Schmid .................. 318/139 X
5,610,493 A 3/1997 Wieloch
5,623,399 A 4/1997 Ishii et al.
5,729,450 A 3/1998 Dimino et al.
5,774,353 A 6/1998 Wieloch
5,844,386 A 12/1998 Matsuoka et al.
5,914,577 A 6/1999 Furnival
6,329,772 B1 * 12/2001 Ochiai et al. ............... 318/139

FOREIGN PATENT DOCUMENTS

DE 198 38 160 A1 2/1999
EP 0 664 273 A1 7/1995
WO WO 98/36489 A1 8/1998

* cited by examiner

*Primary Examiner*—Bentsu Ro
(74) *Attorney, Agent, or Firm*—Birch, Stewart, Kolasch & Birch LLP

(57) ABSTRACT

A vehicle, in the form of a forklift truck, includes a running mechanism, a work mechanism, a master unit, a slave unit, and a communication interface. The running mechanism is used for running of the vehicle, and the work mechanism is used for a work by the vehicle. The master unit controls the running mechanism, and the slave unit controls the lifting mechanism. The communication interface carries out establishment and release of electric connection between the master unit and the slave unit.

17 Claims, 3 Drawing Sheets

VEHICLE WITH RUNNING MECHANISM AND LIFTING MECHANISM

BACKGROUND OF THE INVENTION

1. Field of the Invention

The present invention relates to a vehicle composed of a running mechanism having a running motor and a lifting mechanism having a lifting motor. More particularly, the present invention relates to a vehicle which can change a control system of a lifting mechanism.

2. Description of the Related Art

An electric vehicle is used in a work area in a factory. An electric type forklift truck is used as the electric vehicle, for example. The forklift truck, hereinafter referred to simply as a "forklift", is composed of a running mechanism and a lifting mechanism. The running mechanism is composed of a running motor as a driving source for running of the forklift, an accelerating mechanism and a braking mechanism. The lifting mechanism is composed of a lifting motor as a driving source for a lifting operation by the forklift, an operation lever, and a hydraulic pressure mechanism.

The running control circuit carries out the control of the running motor. The lifting control circuit carries out the control of the lifting motor.

The lifting control circuit is classified based on a driving system of the lifting motor. The types of driving system of the lifting motor may be classified into a manual lever contactor system, a manual lever chopper system and a joystick chopper system.

The lifting control circuit of the manual lever contactor system monitors a switch in conjunction with the movement of an operation lever operated by an operator of the forklift. The lifting control circuit drives the lifting motor in accordance with the turning on or turning off of the switch. The lifting control circuit of the contactor system realizes the control of only the two states, start and stop of the lifting motor.

The lifting control circuit of the chopper system monitors a chopper which carries out voltage control in conjunction with the movement of an operation lever operated by an operation person of the forklift. The lifting control circuit drives the lifting motor in accordance with the voltage value outputted from the chopper. The lifting control circuit of the chopper system can realize multistage speed control of the lifting motor. The chopper system is classified into a simple chopper system and a complex chopper system in accordance with the number of stages of the settable output voltage. In the simple chopper system, two or three stages of output voltage can be set and correspond to lifting speed. In the complex chopper system, three or more stages of the output voltage can be set.

In the lifting control circuit of a joystick system, a lifting motor is driven in accordance with the movement of a single operation lever operated by the operator of the forklift. In the joystick system, the chopper voltage is adjusted to allow the continuous control of the lifting motor to be realized.

The contactor system and simple chopper system are mainly used in the U.S. The complex chopper system and joystick system are used in Europe and Japan.

The running control circuit has the same specification, even if the specifications of the lifting control circuit are different from each other.

FIG. 1 shows a block diagram of a conventional forklift. Referring to FIG. 1, the forklift 10 is composed of a control substrate 11, a running motor 12 and a lifting motor 13. The control substrate 11 is composed of a running control unit 11*a* and a lifting control unit 11*b*. The control substrate 11 may be further composed of a joystick control unit 11*c* in accordance with the specification of the lifting control.

The running control unit 11*a* carries out torque control of the running motor 12. The running motor 12 realizes the running of the forklift 10. The lifting control unit 11*b* detects the movement of a plurality of operation levers to control the lifting motor 13, when the specification of the lifting operation is the contactor system or the chopper system.

The joystick control unit 11*c* detects the movement of the joystick to instruct the lifting control unit 11*b* to drive the lifting motor 13 in accordance with the detection result, when the specification of the lifting operation is the joystick system.

In case that the specification of the lifting operation is a relatively simple contactor system and a simple chopper system, the running control unit 11*a* can carry out the process to be carried out by the lifting control unit 11*b* in place of the lifting control unit 11*b*. In case that the specification of the lifting operation is the contactor system or the simple chopper system, the control substrate 11 is installed with the running control unit 11*a* and/or the lifting control unit 11*b*. In case that the specification of the lifting operation is the complex chopper system, the running control unit 11*a* and the lifting control unit 11*b* are installed on the control substrate 11. When the specification of the lifting operation is a joystick system, the joystick control unit 11*c* is installed on the control substrate 11 in addition to the running control unit 11*a* and the lifting control unit 11*b*.

In the conventional forklift, the running control unit (circuit) 11*a*, the lifting control unit (circuit) 11*b* and the joystick control unit (circuit) 11*c* are installed onto the single substrate 11. Therefore, when of the substrate is selected in accordance with the specification, the assembly of the running control and the lifting control is manufactured.

However, the substrate is prepared in accordance with the specification to have the running control unit 11*a* and the lifting control unit 11*b* (joystick control unit 11*c*). Therefore, the reduction of substrate cost through the mass production is difficult, even if the running control circuits are identical to each other. Also, when a fault occurs in either of the running control circuit and the lifting control circuit, the normal circuit is also replaced at the same time. Therefore, the reduction of maintenance cost is difficult.

SUMMARY OF THE INVENTION

Therefore, an object of the present invention is to provide a vehicle in which a running control structure and a lifting control structure are separated.

Another object of the present invention is to provide a vehicle in which the substrate cost can be reduced through mass production effect of the running control structure.

Still another object of the present invention is to provide a vehicle in which the reduction of maintenance cost can be realized when any fault occurs in either of the running control structure and the lifting control structure.

In order to achieve an aspect of the present invention, a vehicle includes a running mechanism, a work mechanism, a master unit, a slave unit, and a communication interface. The running mechanism is used for running of the vehicle, and the work mechanism is used for a work by the vehicle. The master unit controls the running mechanism, and the slave unit controls the lifting mechanism. The communication interface carries out establishment and release of electric connection between the master unit and the slave unit.

The slave unit may include a function storage unit, a work control unit and a function notifying unit. The work control unit stores data indicative of a control system of the work mechanism in the function storage unit. The function notifying unit reads out the control system data from the function storage unit to notify the master unit through the communication interface. In this case, the master unit may include a partner checking unit for issuing a function notify request to send to the slave unit through the communication interface. The function notifying unit responds to the function notify request to read out the control system data from the function storage unit to notify the master unit through the communication interface.

Also, the partner checking unit issues the function notify request in response to the start of the vehicle or change of a mode from a stop mode to an operation mode. In this case, the master unit includes a running control unit for controlling the running mechanism, and monitors an operation of the vehicle and changes the mode from the operation mode to the stop mode, when the vehicle is not driven for a predetermined time.

Also, the master unit may include a running control unit which controls the running mechanism, and a partner setting unit which instructs the running control unit to start control of the work mechanism through the communication interface, when the partner checking unit cannot receive the control system data from the slave unit through the communication interface.

Also, the work control unit starts control of the work mechanism based on the control system of the work mechanism in response to a control instruction from the master unit through the communication interface, when the master unit issues the control instruction. In this case, the master unit may include a partner setting unit which issues the control instruction to the slave unit through the communication interface, when the control system data is received from the slave unit through the communication interface.

Also, when the vehicle is a forklift and the work mechanism is a lifting mechanism, the work mechanism has a work motor, and the work control unit controls the work motor in response to an operation instruction. In this case, the slave unit may have an instruction lever for instructing an operation of the lifting motor, and for generating the operation instruction in response to an operation of the instruction lever. Instead, when the slave unit may have a joystick for instructing an operation of the lifting motor, and for generating the operation instruction in response to an operation of the joystick.

Also, the lifting motor may be instructed to carry out a constant speed operation, a multi-stage variable speed operation, or a continuously variable speed operation.

In the above, it is desirable that the master unit and the slave unit are assembled on different substrates, respectively.

In order to achieve another aspect of the present invention, a vehicle includes a running mechanism used for running of said vehicle, a working mechanism used for a work by said vehicle, a slave unit provided on a second substrate to control said working mechanism in response to an instruction, and a master unit provided on a first substrate to control said running mechanism and to selectively said working mechanism based on a function of said working mechanism.

Also, in a still another aspect of the present invention, a method of controlling a working mechanism, is attained by setting a control system of a working mechanism; by communicating between a running controller and a working controller such that a running controller recognizes said control system of said working mechanism; by controlling a running mechanism by said running controller; and by selectively controlling said working mechanism by said running controller or said working controller based on establishment of the communication and said control system of said working mechanism.

DESCRIPTION OF THE PREFERRED EMBODIMENTS

Hereinafter, a forklift of the present invention will be described below in detail with reference to the attached drawings.

Figure 1:
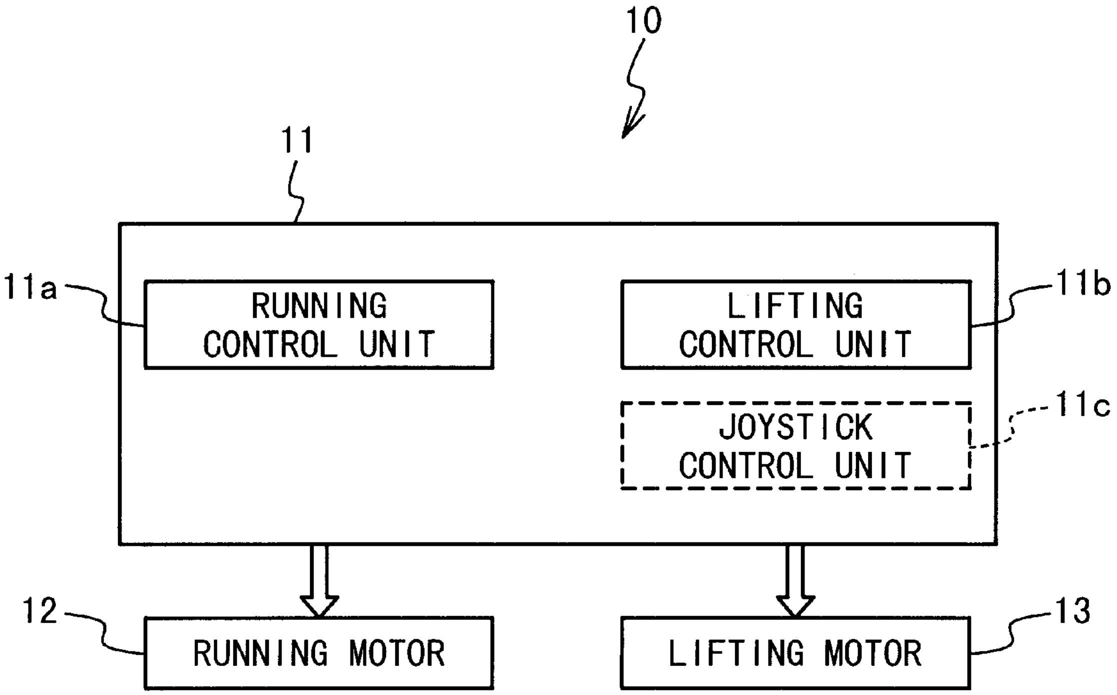
Fig. 1 PRIOR ART
FIG. 1 is a block diagram of a conventional forklift.
Figure 2:
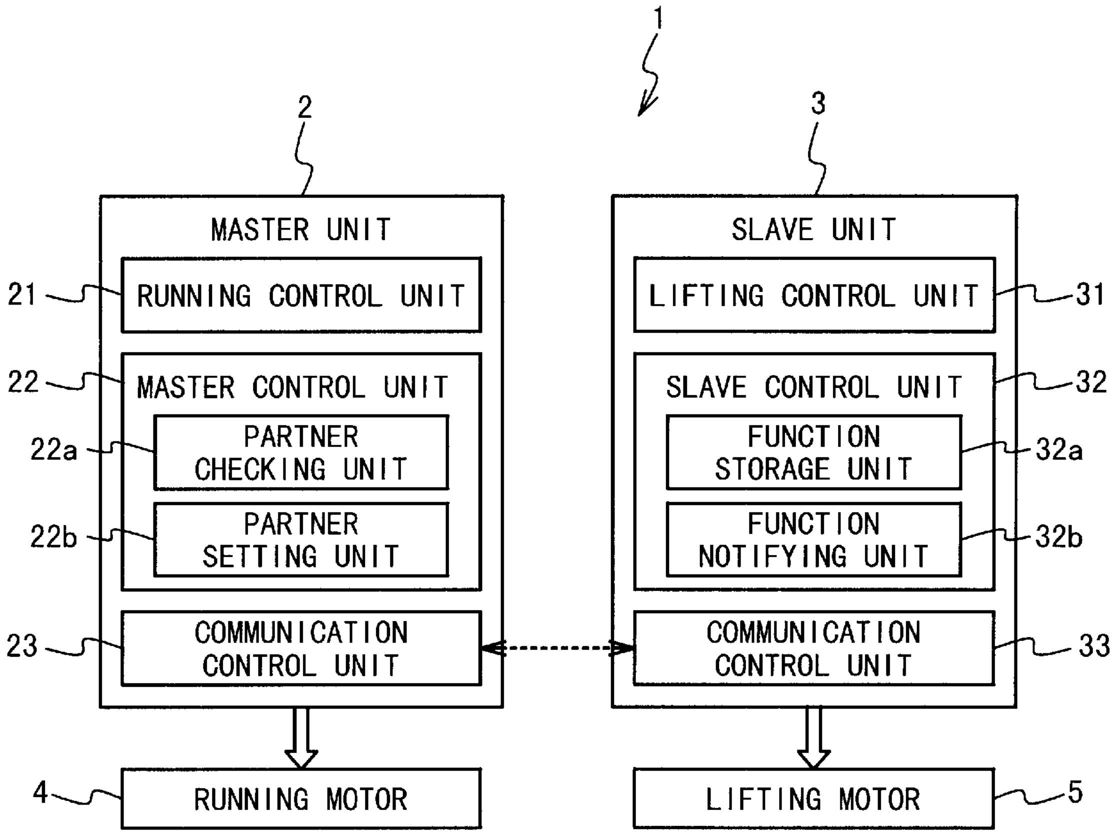
FIG. 2 is a block diagram showing the structure of a forklift according to an embodiment of the present invention.

FIG. 2 shows a block diagram showing the structure of a forklift according to an embodiment of the present invention. Referring to FIG. 2, the forklift 1 is composed of a master unit 2, a slave unit 3, a running motor 4 and a lifting motor 5.

The master unit 2 is composed of a running control unit 21, a master control unit 22 and a communication control unit 23. The master control unit 22 is composed of a partner checking unit 22*a* and a partner setting unit 22*b*. The slave unit 3 is composed of a lifting control unit 31, a slave control unit 32 and a communication control unit 33. The slave control unit 32 is composed of a function storage unit 32*a* and a function notifying unit 32*b*.

The master unit 2 carries out the running control of the forklift 1. The running control unit 21 carries out the drive control of the running motor 4. The running motor 4 realizes the running operation of the forklift 1 based on the control of the master unit 2.

The slave unit 3 carries out the lifting control of the forklift 1. The lifting control unit 31 carries out the drive control of the lifting motor 5, to execute the lifting operation in the contactor system, the chopper system (simple chopper system and complex chopper system) and the joystick system. The lifting motor 5 realizes the lifting operation of the forklift 1 based on the control of the slave unit 3.

The master control unit 22 detects the slave unit 3 connected to the master unit and the specification of the lifting operation corresponding to the slave unit 3. The communication control unit 23 carries out communication with the slave unit 3. For example, the communication control unit 23 corresponds to the RS232C standard. The running control unit 21 can control the lifting operation in the contactor system.

The slave control unit 32 notifies the specification of the slave unit 3 to the master unit 2. The specification of the slave unit 3 is previously stored in the function storage unit 32*a*. The function notifying unit 32*b* notifies the specification stored in the function storage unit 32*a* to the master unit 2 in accordance with the request from the master unit 2. The communication control unit 33 carries out communication to the master unit 2. The communication control unit 23 and the communication control unit 33 can be directly connected to each other through a connector.

Figure 3:
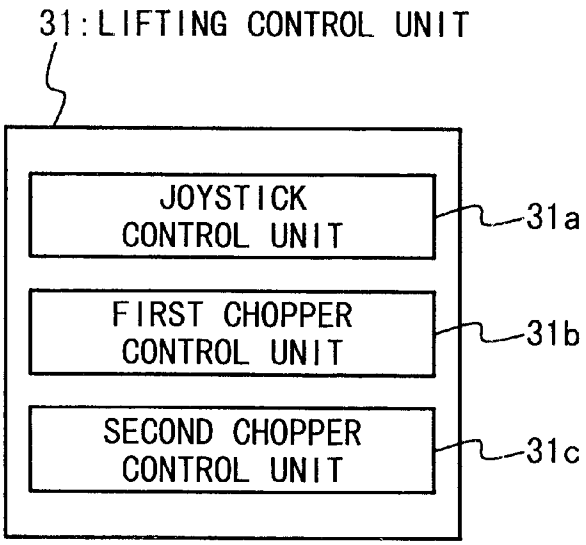
FIG. 3 is a block diagram showing the structure of a lifting control unit in the forklift according to the embodiment of the present invention.

FIG. 3 is a block diagram of the lifting control unit of the present invention. Referring to FIG. 3, the lifting control unit 31 is composed of joystick control unit 31*a*, a first chopper control unit 31*b* and a second chopper control unit 31*c*. The joystick control unit 31*a* is activated to control the lifting operation when the specification of the joystick system is set to the slave unit 3. The first chopper control unit 31*b* is activated to control the lifting operation when the specification of the simple chopper system is set to the slave unit 3. The second chopper control unit 31*c* is activated to control the lifting operation when the specification of the complex chopper system is set to the slave unit 3.

The specification or control system of the slave unit 3 is determined based on the function setting by the lifting control unit 31. For example, he function setting is carried out by setting DIP witches (not illustrated) which are provided for the slave unit 3. When either of the joystick control unit 31*a*, the first chopper control unit 31*b* and the second chopper control unit 31*c* is selected, the selected information is stored in the function storage unit 32*a*.

The slave unit 3 may have an instruction lever (not shown) for instructing an operation of the lifting motor, and for generating the operation instruction in response to an operation of the instruction lever. The slave unit 3 controls the lifting mechanism in response to the instruction. Instead, the slave unit 3 may have a joystick (not shown) for instructing an operation of the lifting motor, and for generating the operation instruction in response to an operation of the joystick. The slave unit 3 controls the lifting mechanism in response to the instruction. In this control, the slave unit 3 controls the lifting motor to carry out a constant speed operation, a multi-stage variable speed operation, or a continuously variable speed operation based on the specification or control system of the lifting mechanism as a working mechanism. On the contrary, the main unit 3 may have a lever (not shown) for instructing an operation of the lifting motor and the running motor. In this case, the main unit 2 controls the lifting motor and the running motor.

Figure 4:
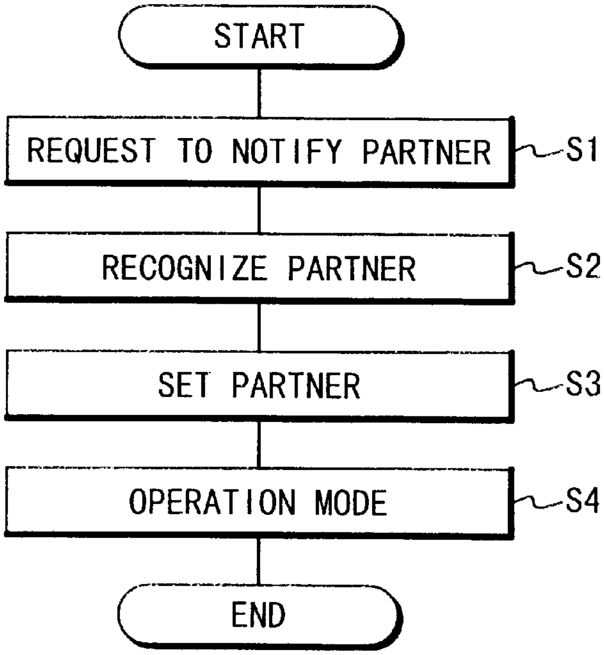
FIG. 4 is a flow chart showing the operation of the forklift according to the embodiment of the present invention.

Next, referring to FIG. 2 to FIG. 4, the operation of the forklift 1 according to the embodiment of the present invention will be described. FIG. 4 is a flow chart showing the operation of the forklift according to the embodiment of the present invention. It is supposed in this example that the joystick control unit 31*a* of the lifting control unit 31 is selected in the slave unit 3, before the slave unit 3 is connected to the master unit 2. The information indicative of the specification of the joystick system is stored in the function storage unit 32*a*.

When the master unit 2 is activated, the partner checking unit 22*a* is stated. The partner checking unit 22*a* issues a request to the slave unit 3 through the communication control unit 23 to notify a partner (a specification notify request) (S1). When the function notifying unit 32*b* of the slave unit 3 receives the specification notify request, the function notifying unit 32*b* reads out the information stored from the function storage unit 32*a*. Then, the function notifying unit 32*b* notifies the information, to the master unit 2 through the communication control unit 33. The partner setting unit 22*b* recognizes the specification of the partner, i.e., the specification of the slave unit 3 based on the information (S2), when receiving the information from the slave unit. The partner setting unit 22*b* notifies the recognized specification to the running control unit 21. Also, the partner setting unit 22*b* transmits the recognition information to the slave unit 3. The partner setting or electric connection between the master unit 2 and the slave unit 3 is established based on these notifying operation and transmitting operation (S3). It should be noted that the partner setting unit 22*b* determines that a connection is not established with the slave unit 3 and instructs the running control unit 21 to carry out the control based on the contactor system, when the communication with the slave unit 3 through the communication control unit 23 cannot be carried out.

The running control unit 21 switches the operation mode based on the notice from the partner setting unit 22*b* (S4). On the other hand, the function notifying unit 32*b* notifies the recognition notice which has been transmitted from the master unit 2 to the lifting control unit 31. The joystick control unit 31*a* of the lifting control unit 31 is switched to the operation mode.

In case of start of the forklift 1, the above-mentioned process is carried out. Thus, the setting of the system requirements is realized in accordance with the specification of the slave unit 3.

When the first chopper control unit 31*b* of the lifting control unit 31 is set to be valid, the forklift 1 carries out the lifting operation of the simple chopper system. When the second chopper control unit 31*c* of the lifting control unit 31 is set to be valid, the forklift 1 carries out the lifting operation of the complex chopper system. When the slave unit 3 is not connected to the master unit 2, the forklift 1 carries out the lifting operation of the contactor system which is controlled by the running control unit 21.

The running control unit 21 monitors the operation of the forklift 1. When any instruction to move the running motor 4 or the lifting motor 5 is not generated for a predetermined time period, the running control unit 21 may be switched to a power saving mode or an operation stop mode. The power saving mode is an operation mode in which only the units are operated which are necessary to monitor an operation instruction from the operator. The operation stop mode is a state in which the master power of the forklift 1 is blocked off. When the master power is blocked off, the forklift 1 is set to the operation mode through the process described with reference to FIG. 4.

The present invention is not limited to the above embodiment. In the above embodiment, the forklift is raised as an example of the vehicle. However, if a vehicle has a running system independent from a controlled system, the present invention can be applied. Also, the controlled system is not limited to the motor, and may be a hydraulic pressure mechanism which uses the power of an engine.

In the embodiment, a slave unit is exemplified to be able to select either of the joystick system, the chopper system and the joystick chopper system. However, the slave unit may be the exclusive use unit of either system. In this case, the operation for selecting a system is not needed. Also, an example in which DIP switches are used to select a system is described. However, the master unit or the slave unit may set a system automatically by detecting an operation lever or joystick.

In accordance with the present invention, a running control substrate and a lifting control substrate are separated. Therefore, a general purpose running control substrate can be mass-produced so that the cost of the running control substrate can be reduced. Also, in accordance with the present invention, when a fault occurs in either of the running control substrate and the lifting control substrate, only the fault substrate is sufficient to be exchanged. Therefore, the exchanged structure is limited to the substrate in which the fault occurred so that the reduction of the maintenance cost can be realized.

What is claimed is:

1. A vehicle comprising:

a running mechanism used for running of said vehicle;

a working mechanism used for a work by said vehicle;

a master unit which controls said running mechanism;

a slave unit which controls said working mechanism; and a communication interface which carries out establishment and release of electric connection between said master unit and said slave unit.

2. The vehicle according to claim 1, wherein said slave unit comprises:

a function storage unit;

a work control unit which stores data indicative of a control system of said working mechanism in said function storage unit;

a function notifying unit which reads out said control system data from said function storage unit to notify said master unit through said communication interface.

3. The vehicle according to claim 2, wherein said master unit includes:

a partner checking unit which issues a function notify request to send to said slave unit through said communication interface, and wherein said function notifying unit responds to said function notify request to read out said control system data from said function storage unit to notify said master unit through said communication interface.

4. The vehicle according to claim 3, wherein said partner checking unit issues said function notify request in response to start of said vehicle or change of a mode from a stop mode to an operation mode.

5. The vehicle according to claim 4, wherein said master unit includes:

a running control unit which controls said running mechanism, and monitors an operation of said vehicle and changes said mode from said operation mode to said stop mode, when said vehicle is not driven for a predetermined time.

6. The vehicle according to claim 3, wherein said master unit includes:

a running control unit which controls said running mechanism; and a partner setting unit which instructs said running control unit to start control of said working mechanism through said communication interface, when said partner checking unit cannot receive said control system data from said slave unit through said communication interface.

7. The vehicle according to claim 2, wherein said work control unit starts control of said working mechanism based on said control system of said working mechanism in response to a control instruction from said master unit through said communication interface, and wherein said master unit issues said control instruction.

8. The vehicle according to claim 7, wherein said master unit includes:

a partner setting unit which issues said control instruction to said slave unit through said communication interface, when said control system data is received from said slave unit through said communication interface.

9. The vehicle according to claim 7, wherein said vehicle is a forklift truck, said working mechanism is a lifting mechanism, said lifting mechanism has a lift motor, and said work control unit controls said lift motor in response to a operation instruction.

10. The vehicle according to claim 9, wherein said slave unit has an instruction lever for instructing an operation of said lift motor, and generating said operation instruction in response to an operation of said instruction lever.

11. The vehicle according to claim 9, wherein said slave unit has a joystick for instructing an operation of said lift motor, and generating said operation instruction in response to an operation of said joystick.

12. The vehicle according to claim 9, wherein said lift motor is instructed to carry out a constant speed operation.

13. The vehicle according to claim 9, wherein said lift motor is instructed to carry out a multi-stage variable speed operation.

14. The vehicle according to claim 9, wherein said lift motor is instructed to carry out a continuously variable speed operation.

15. The vehicle according to claim 1, wherein said master unit and said slave unit are assembled on different substrates-, respectively.

16. A vehicle comprising:

a running mechanism used for running of said vehicle;

a working mechanism used for a work by said vehicle;

a slave unit provided on a second substrate to control said working mechanism in response to an instruction; and a master unit provided on a first substrate to control said running mechanism and to selectively control said working mechanism based on a function of said working mechanism.

17. A method of controlling a working mechanism, comprising:

setting a control system of a working mechanism;

communicating between a running controller and a working controller such that a running controller recognizes said control system of said working mechanism;

controlling a running mechanism by said running controller; and selectively controlling said working mechanism by said running controller or said working controller based on establishment of the communication and said control system of said working mechanism.

* * * * *